United States Patent
Wu et al.

(10) Patent No.: US 12,449,507 B2
(45) Date of Patent: Oct. 21, 2025

(54) TIMING OFFSET COMPENSATION IN COHERENT DISTRIBUTED RADAR

(71) Applicant: NXP B.V., Eindhoven (NL)

(72) Inventors: Yan Wu, Sint-oedenrode (NL); Wilhelmus Johannes Van Houtum, Sint-oedenrode (NL)

(73) Assignee: NXP B.V., Eindhoven (NL)

( * ) Notice: Subject to any disclaimer, the term of this patent is extended or adjusted under 35 U.S.C. 154(b) by 407 days.

(21) Appl. No.: 18/090,798

(22) Filed: Dec. 29, 2022

(65) Prior Publication Data

US 2024/0219515 A1 Jul. 4, 2024

(51) Int. Cl.
G01S 7/35 (2006.01)
G01S 13/58 (2006.01)

(52) U.S. Cl.
CPC ............ G01S 7/352 (2013.01); G01S 13/584 (2013.01)

(58) Field of Classification Search
CPC .... G01S 13/931; G01S 13/343; G01S 13/584; G01S 13/87; G01S 13/003; G01S 7/356; G01S 7/023; G01S 7/352; G01S 2013/0254; G01S 2013/0263; G01S 2013/0245
USPC ...................................................... 342/59, 70
See application file for complete search history.

(56) References Cited

U.S. PATENT DOCUMENTS

| | | | | |
|---|---|---|---|---|
| 9,260,114 B2* | 2/2016 | Tokimasa | ............... | G01S 13/931 |
| 9,260,115 B2* | 2/2016 | Tokimasa | ............... | B60W 30/16 |
| 9,266,534 B2* | 2/2016 | Tokimasa | ............... | B60W 10/06 |
| 9,689,983 B2* | 6/2017 | Cao | ......................... | G01S 13/42 |
| 9,783,196 B2* | 10/2017 | Tokimasa | ............... | B60W 30/16 |
| 9,921,305 B2* | 3/2018 | Cao | ......................... | G01S 7/2927 |
| 10,557,931 B2* | 2/2020 | Schoor | ................... | G01S 13/584 |
| 10,690,750 B2* | 6/2020 | Bilik | ........................ | G01S 13/87 |
| 10,732,273 B2* | 8/2020 | Lim | ..................... | G01S 13/4418 |
| 10,775,489 B2* | 9/2020 | Rao | ........................ | G01S 13/931 |
| 11,092,683 B2* | 8/2021 | Wu | ......................... | G01S 13/931 |
| 11,269,049 B2* | 3/2022 | Wu | ........................ | G01S 13/931 |
| 11,327,172 B2* | 5/2022 | You | ....................... | G01S 7/0232 |
| 11,500,061 B2* | 11/2022 | Loesch | ................. | G01S 13/931 |

(Continued)

OTHER PUBLICATIONS

Gottinger, M. et al; "Coherent Full-Duplex Double-Sided Two-Way Ranging and Velocity Measurement Between Separate Incoherent Radio Units"; IEEE Trans. On Microwave Theory and Techniques, vol. 67; pp. 2045-2061 (May 2019).

(Continued)

*Primary Examiner* — Michael W Justice (57) ABSTRACT

A system and method for processing radar signals is presented. A first chirp signal received via a first radar device of a distributed aperture bi-static radar system is processed to determine a first value indicative of a first distance to a first target. A second chirp signal received via a second radar device is processed to determine a second value indicative of a second distance to a second target. After determining that the first target and the second target are the same target, a timing offset value is determined based upon a difference between the first value and the second value, and the timing offset value is used to modify at least one of a third chirp signal received by the first radar device and a fourth chirp signal received by the second radar device to mitigate a timing offset between operations of the first radar device and the second radar device.

19 Claims, 5 Drawing Sheets

(56) References Cited

U.S. PATENT DOCUMENTS

| | | | | |
|---|---|---|---|---|
| 11,656,325 | B2* | 5/2023 | Arbabian | G01S 7/415 |
| | | | | 342/169 |
| 11,733,346 | B2* | 8/2023 | Gulati | G01S 7/006 |
| | | | | 342/60 |
| 11,802,960 | B2* | 10/2023 | You | G01S 13/931 |
| 11,906,655 | B2* | 2/2024 | Vossiek | G01S 13/9023 |
| 2015/0175162 | A1* | 6/2015 | Nakadori | B60W 30/16 |
| | | | | 701/96 |
| 2016/0009280 | A1* | 1/2016 | Tokimasa | B60W 30/16 |
| | | | | 701/96 |
| 2016/0009282 | A1* | 1/2016 | Tokimasa | G01S 13/931 |
| | | | | 701/96 |
| 2016/0009283 | A1* | 1/2016 | Tokimasa | B60W 30/14 |
| | | | | 701/96 |
| 2016/0009284 | A1* | 1/2016 | Tokimasa | B60W 10/10 |
| | | | | 701/96 |
| 2016/0041260 | A1* | 2/2016 | Cao | G01S 7/285 |
| | | | | 342/129 |
| 2016/0284213 | A1* | 9/2016 | Cao | G01S 13/584 |
| 2017/0131393 | A1* | 5/2017 | Schoor | G01S 13/42 |
| 2018/0172813 | A1* | 6/2018 | Rao | G01S 13/343 |
| 2018/0210067 | A1* | 7/2018 | Bilik | G01S 13/003 |
| 2020/0300965 | A1* | 9/2020 | Wu | G01S 7/42 |
| 2020/0300995 | A1* | 9/2020 | Wu | G01S 13/931 |
| 2020/0379100 | A1* | 12/2020 | Kitamura | G01S 13/72 |
| 2021/0011121 | A1* | 1/2021 | Arbabian | G01S 7/415 |
| 2021/0072350 | A1* | 3/2021 | Loesch | G01S 13/343 |
| 2021/0270961 | A1* | 9/2021 | You | G01S 13/931 |
| 2021/0405183 | A1* | 12/2021 | Vossiek | G01S 7/023 |
| 2022/0268878 | A1* | 8/2022 | Gulati | G01S 13/931 |
| 2025/0093498 | A1* | 3/2025 | Shabtay | G01S 13/881 |

OTHER PUBLICATIONS

Gottinger, M. et al; "Coherent Automotive Radar Networks: The Next Generation of Radar-Based Imaging and Mapping"; IEEE J. of Microwaves, vol. 1, No. 1; pp. 149-163 (Jan. 2021).

U.S. Appl. No. 17/487,167; 26 pages, filed Sep. 28, 2021.

U.S. Appl. No. 17/712,445; 57 pages, filed Apr. 4, 2022.

* cited by examiner

TIMING OFFSET COMPENSATION IN COHERENT DISTRIBUTED RADAR

TECHNICAL FIELD

The present disclosure is directed in general to radar systems and associated methods of operation. In one aspect, the present disclosure relates to a coherent distributed radar system that is configured to estimate and compensate for timing offsets in bi-static radar applications.

BACKGROUND

A radar system transmits an electromagnetic signal and receives back reflections of the transmitted signal. The time delay and/or time delay variation between the transmitted and received signals can be determined and used to calculate the distance and/or the speed of objects causing the reflections, respectively. For example, in automotive applications, automotive radar systems can be used to determine the distance and/or the speed of oncoming vehicles and other obstacles.

Automotive radar systems enable the implementation of advanced driver-assistance system (ADAS) functions that are likely to enable increasingly safe driving and, eventually, fully autonomous driving platforms. Such system use radar systems as the primary sensor ADAS operations. As such, the radar systems may generally provide good angular resolution, which may require larger antenna apertures, and therefore physically larger radars. Unfortunately, the requirement of having larger radars can conflict with other design and/or operational constraints, such as integrating a large aperture radar into a vehicle which has competing requirements for design, structure, and/or operation. Keeping the size of radar sufficiently small so it can be integrated with other parts of the vehicle implies that the aperture of the radar is constrained and thus the angular resolution is limited.

Existing radar systems have attempted to address these challenges by using techniques (e.g., bistatic multiple-input multiple-output radar) which effectively combine a plurality of distributed, smaller aperture radars to form a larger virtual aperture. However, these techniques typically require that the distributed radars share a common reference local oscillator (LO) signal (so the radars operate on the same frequency and time reference) and/or require complex and expensive modifications to hardware and software to cross-correlate or mix target return signals with the signals from other transmitters. Unfortunately, these requirements may not be possible due to car integration, complexity, and/or cost constraints which prevent such solutions from being robustly and economically implemented. As seen from the foregoing, the existing radar system solutions are extremely difficult at a practical level by virtue of the challenges with achieving the performance benefits of larger size radars within the performance, design, complexity and cost constraints of existing radar system applications.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter of the application and uses of such embodiments. As used herein, the words "exemplary" and "example" mean "serving as an example, instance, or illustration." Any implementation or embodiment described herein as exemplary, or an example is not necessarily to be construed as preferred or advantageous over other implementations. Furthermore, there is no intention to be bound by any expressed or implied theory presented in the preceding technical field, background, or the following detailed description.

A coherent distributed radar (CDR) system produces target scene information using multiple coherent and spatially separated radar subsystems. In selected embodiments, a signal processing methodology and algorithm are disclosed for controlling a plurality of physically distributed, small aperture radars in a bi-static or multi-static radar system to determine a timing offset between operations of a first and second radar subsystem in a CDR system. In contrast to conventional methods that may rely upon complicated chirp signal transmission plans to determine timing offset, the present timing offset estimation and compensation scheme instead relies upon the reciprocity of bi-static radar scenes in a CDR system.

Due to the timing offset in the operations of the two radar subsystems in a CDR system, the observed distances of targets are shifted as between a first radar subsystem and a second radar subsystem. Due to operational reciprocity, these shifts in observed target distances between the two bi-static radar scenes have the same magnitude but are of opposite signs, i.e., forming mirror images around the correct target distance. In short, the first radar subsystem may determine the distance to a particular object to be less than the actual distance while at the same time the second radar subsystem would determine the distance to the same object to be greater than the actual distance by the same offset amount.

By exploiting that reciprocal error, the timing offset between then first and second radar subsystems can be estimated from the different observed target distances of the two bi-static radar subsystems and corrected (e.g., by using multiplication with a complex exponential). This approach may be utilized without requiring transmissions of specially arranged chirp plans commonly used in conventional approaches for timing offset estimation.

As described herein, in accordance with the present disclosure any target in the radar scene may be used for timing offset estimation (although typically the strongest target will be used). This further enables target offset estimation without requiring a dedicated reference target signal to be distributed between the two radar subsystems using a separate dedicated communication link.

In the context of the present disclosure, it will be appreciated that radar systems including CDR radar systems may be used as sensors in a variety of different applications, including but not limited to automotive radar sensors for road safety systems, such as advanced driver-assistance systems (ADAS) and autonomous driving (AD) systems. In such applications, the radar systems are used to measure the radial distance to a reflecting object (i.e., a 'target') and its relative radial velocity, and are characterized by performance criteria, such as the angular resolution, sensitivity, false detection rate, and the like. Typically, frequency modulated continuous wave (FMCW) modulation techniques are used to identify the distance and/or velocity of a radar target, such as a car or pedestrian, by transmitting FMCW-modulated signals from multiple transmit antennas so that reflected signals from the radar target are received at multiple receive antennas and processed to determine the radial distance and relative radial velocity and direction for the radar target. However, with current automotive designs, a vehicle can include multiple radar units that can operate independently from one another. For example, bi-static CDR systems form a single large aperture by having each individual radar unit receive the other radar unit's transmissions and then coherently process the received signals with the received transmissions from the other radars for estimating target parameters.

Figure 1:
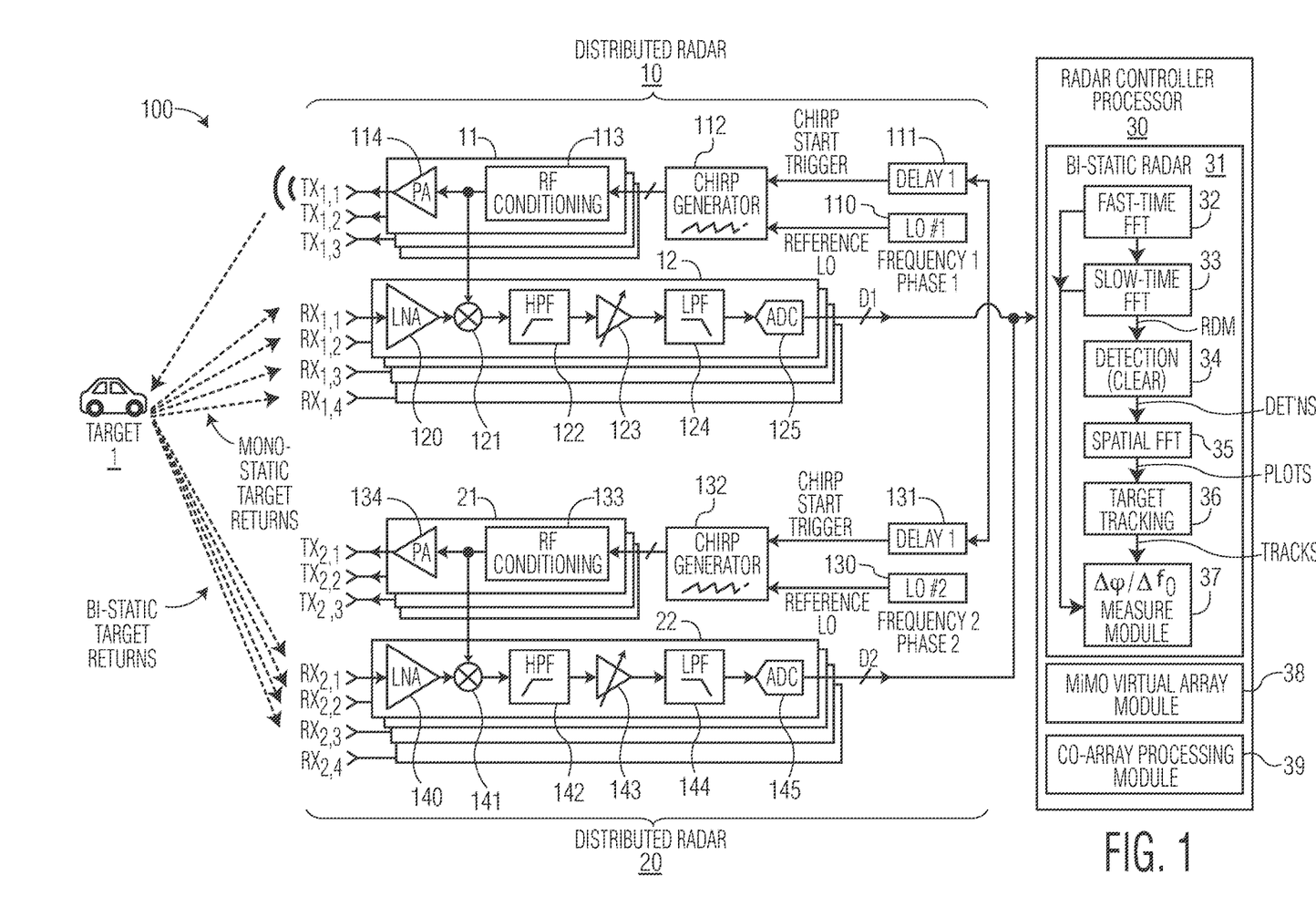
FIG. 1 is a simplified schematic diagram of a distributed coherent radar system that includes two or more distributed radar devices connected to a radar controller processor.

To illustrate the operation of such a CDR system, FIG. 1 is a simplified schematic diagram of a distributed coherent radar system 100 that includes two or more distributed radar devices 10, 20 connected to a radar controller and processor 30. In selected embodiments, each of the distributed radar devices 10, 20 may be embodied as a line-replaceable unit (LRU) or modular component that is designed to be replaced quickly at an operating location. Similarly, the radar controller processor 30 may be embodied as a line-replaceable unit (LRU) or modular component. Although two distributed radar devices 10, 20 are shown, it will be appreciated that additional distributed radar devices may be used. In addition, the depicted radar system 100 may be implemented in integrated circuit form with the distributed radar devices 10, 20 and the radar controller processor 30 formed with separate integrated circuits (chips) or with a single chip, depending on the application.

Each distributed radar device 10, 20 are each multi-antenna radar devices that include one or more transmitting antenna elements TXij and receiving antenna elements RXij connected, respectively, to one or more radio-frequency (RF) transmitter (TX) units 11, 21 and receiver (RN) units 12, 22. For example, each radar device (e.g., radar unit 10) is shown as including individual antenna elements (e.g., TX1,j, RX1,j) connected, respectively, to three transmitter modules (e.g., 11) and four receiver modules (e.g., 12), but these numbers are not limiting and other numbers are also possible, such as four transmitter modules 11 and six receiver modules 12, or a single transmitter module 11 and/or a single receiver modules 12. Each radar device 10, 20 also includes a chirp generator 112, 132 which is configured and connected to supply a chirp input signal to the transmitter modules 11, 21. To this end, the chirp generator 112, 132 is connected to receive a separate and independent local oscillator (LO) signal generator 110, 130 so that the distributed radars 10, 20 may not share a common local oscillator (LO) signal and may operate in a non-coherent fashion. In addition, a common chirp start trigger signal may be shared amongst the chirp generators 112, 132, though delays are likely to be different due to the signal path differences and programmable digital delay elements 111, 131. As a result, the transmitter elements 11, 12 may operate in a non-coherent fashion because, even though they are programmed to transmit identical waveforms and share a common schedule, the generated waveforms are likely to have distinct starting frequencies, phases, and transmitting time, resulting in some timing offset in the operations of each of radar device 10, 20.

The radar system 100 also includes a radar controller processing unit 30 that is connected to supply input control signals to the distributed radar devices 10, 20 and to receive therefrom digital output signals generated by the receiver modules 12, 22. In selected embodiments, the radar controller processing unit 30 may be embodied as a micro-controller unit (MCU) or other processing unit that is configured and arranged for signal processing tasks such as, but not limited to, target identification, computation of target distance, target velocity, and target direction, and generating control signals. The radar controller processing unit 30 may, for example, be configured to generate calibration signals, receive data signals, receive sensor signals, generate frequency spectrum shaping signals (such as ramp generation in the case of FMCW radar) and/or state machine signals for RF (radio frequency) circuit enablement sequences.

In the example shown, each chirp generator 112, 132 generates a chirp signal in response to a chirp start trigger signal generated by the delay circuit 111, 131, and a corresponding reference local oscillator signal LO #1, LO #2 generated by frequency synthesizer unit 110, 130. Since the reference LO signals are independent, they may have different frequency and phase values, which in turn affects the frequency and phase of the generated chirp signal. The resulting chirp signal from each generator 112, 132 is then processed by the RF conditioning unit 113, 133 and amplified at the power amplifier (PA) 114, 134 which amplifies the signal to a level suitable for transmission as a radar signal by a transmitter antenna unit TX1,iTX2,j. Though not shown, it will be understood that the transmitter module 11, 21 may include additional processing circuits, such as a digital-to-analog converter (DAC), phase shifter (or phase rotator), buffer, mixer, filter, and the like.

The radar signal transmitted by the transmitter antenna units TX1,i, TX2,i may by reflected by an object, such as a vehicle target 1. Part of the reflected radar signal (e.g., mono-static target returns) reaches receiver antenna units RX1,i at the first distributed radar device 10, and another part (e.g., bi-static target returns) reaches receiver antenna units RX2,i at the second distributed radar device 20.

At each receiver module 12, 22, the received (radio frequency) antenna signal is amplified by a low noise amplifier (LNA) 120, 140 and then fed to a mixer 121, 141 where it is mixed with the RF conditioned signal generated by the RF conditioning unit 113, 133. The resulting intermediate frequency signal is fed to a first high-pass filter (HPF) 122, 142. The resulting filtered signal is fed to a first variable gain amplifier 123, 143 which amplifies the signal before feeding it to a first low pass filter (LPF) 124, 144. This re-filtered signal is fed to an analog-to-digital converter (ADC) 125, 145 and is output by each receiver module 12, 22 as a digital signal D1, D2, etc.

Under control of the radar controller processor 30, the distributed coherent radar system 100 is configured to operationally combine multiple, physically separated small-aperture radar units 10, 20 to function as a single large coherent aperture radar. To this end, the radar controller processor 30 may be configured with a bi-static radar module 31 which is operative to combine the distributed aperture signal results without requiring physically mixing or correlating received target returns with the signals received from other transmitters. However, to achieve this result, the differences in the starting frequency and phase for the reference LO signals must be determined before the system can function as a single radar by coordinating the distributed radar devices 10, 20 to operate in a coherent fashion. Accordingly, any time offsets ($\Delta t0$) amongst distributed radar units 10, 20 must be known in order to properly process signals processed by radar units 10, 20. In conventional systems, this timing offset is presumed to be known or otherwise derived by the application of complex system configuration algorithms requiring the transmission and processing of specially configured chirp signals, as described above.

In addition to the bi-static radar aperture construction, the radar controller processor 30 may be configured to construct and accumulate multiple-input-multiple-output (MIMO) array outputs to form a MIMO aperture. To this end, the radar controller processor 30 may be configured with a MIMO virtual array module 38 which is operative to alternate the transmitting "master" role among the distributed radar units 10, 20 so that an extended MIMO aperture can be formed based on MIMO radar principles.

In a radar system comprising multiple radar units it is desirable that signals received from the radar units be processed coherently, which can require precise knowledge of any timing offset in the operations of the two or more radar units. Conventionally, coherent operations of a pair of radar units can be achieved by sharing the same clock signal between the two radar units (e.g., by sending the clock signal of the first radar unit to the second radar unit). Due to a number of factors (e.g., propagation delays of the clock signal from the first unit to the second unit), a timing offset can exist between the clock signals of the two radar units, and, thereby, the operations of the radar units. This timing offset is preferably corrected to ensure correct operation of such a coherent distributed radar system.

Approaches for mitigating these timing offsets in conventional radar systems often rely upon the transmission and analysis of complicated sets of sequential upchirp and downchirp signals. These approaches, however, create complexity in the system's chirp-plans, which can be difficult and costly to implement. Moreover, these approaches are not compliant with the conventional chirp-plans utilized for conventional mono-static radar scenarios. Additionally, timing offset estimation approaches that rely on these complex up- and down-chip plans tend to require additional a priori knowledge of true distance information (e.g., from the mono-static response, or from a dedicated reference target) without timing offset.

To mitigate these problems associated with conventional timing offset mitigation (and others), the present disclosure provides a timing offset estimation approach that exploits the reciprocity of the bi-static radar-scenes in coherent distributed radar systems. Due to any timing offset between any two radar units in such a radar system, determined target distances by each radar unit are shifted from the correct values. Due to reciprocity in the radar system's operation, those shifts or offsets in target distances determined by each of the two bi-static radar scenes have the same magnitude but opposite signs (i.e., forming a mirror image around the correct target distance).

Timing offset can be estimated from these differences of the bi-static target distances as determined by the two radar units and appropriately corrected. This approach does not require the transmission of complex up- and downchirps signals. Moreover, in the present approach, any target detected in the radar scene by both radar units can be used for timing offset estimation, therefore, saving the necessity of transmitting a dedicated reference target signal between the two radar units using a separate dedicated link. Timing offset may be estimated and corrected in accordance with this disclosure using conventional radar system hardware and does not require any special hardware or signal paths within the radar system.

In frequency-modulated continuous-wave radar-systems, a high frequency sine wave is typically used as a carrier wave. Within the radar system's received reflection signals, target range information is mixed with the Doppler velocity using this technique. Transmitted signal modulation may be disabled on alternate scans to enable the determination of velocity data within the received reflection signals using unmodulated carrier frequency shift. This allows range and velocity to be found with one radar data set (i.e., a two-dimensional matrix or frame of data comprising received RF signal levels across a number of transmitted RF signal chirps) or alternatively, with a two-dimensional fast Fourier-transform (2D-FFT), the fast-chirp version of FMCW.

Figure 2:
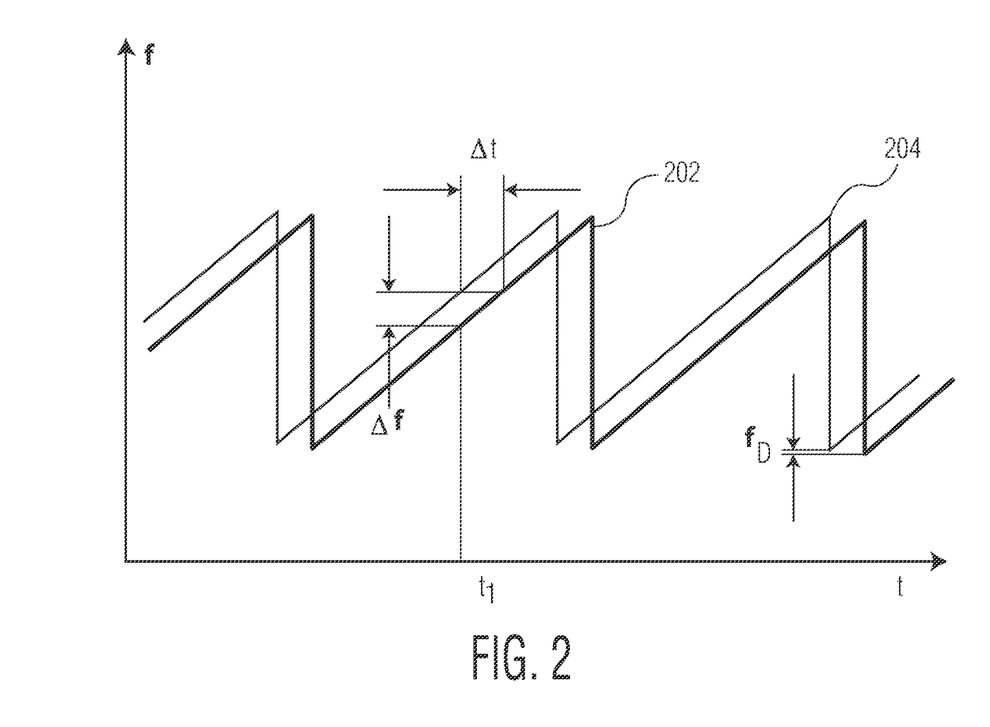
FIG. 2 depicts a typical chirp waveform in which delayed reflection signals may be received in response to a transmitted radar signal by a radar system.

In these various radar system implementations, an upchirp wave modulation may be utilized for the signals transmitted by the radar system. To illustrate, FIG. 2 is a chart depicting a typical chirp wave with upchirp The horizontal axis represents time, while the vertical axis represents frequency. FIG. 2 depicts the transmitted signal as trace 202, while trace 204 represents the delayed replica of the transmitted waveform that may be received in response to the transmitted signal by a radar system.

Upon receipt of the reflected signal (trace 204), the transmitted signal frequency can used to down-convert the received signal to baseband, and the amount of frequency shift between the transmit signal (trace 202) and the reflected signal (trace 204) (i.e., $\Delta f$) increases with time delay, which correlates to distance. The time delay, in turn, is a measure of a target's range; where a small frequency shift is produced by reflections from nearby targets while a larger frequency shift corresponds with reflections from more distant targets.

With the advent of modern electronics, digital signal processing is used for most reflection signal processing to identify targets. Once processed, the beat signals retrieved from the received reflection signals are passed through an analog-to-digital-converter (ADC), and digital processing is performed on the result to identify target distance and speed.

In an FMCW radar application, target ranges can be determined from a received reflection signal that includes a linear ramp waveform (i.e., the triangular waveform of FIG. 2) is given in the following set of equations for the modulator-portion (i.e., the FMCW-transmitter). The signal transmitted by the radar system (Tx) is therefore given by equation 1, below.

$$Tx{:}x(t) = \mathcal{R}\left\{\exp\left(j2\pi\left(f_c t + \frac{1}{2}\mu t^2\right)\right)\right\} \quad \text{Eq. 2}$$

In equation 3 $\mathcal{R}\{\bullet\}$ has as inputs the real-part, $f_c$ is the carrier-frequency, $$\mu = \frac{B_{\it eff}}{T_{FFT}}$$

the chirp-rate (chirp-slope), $B_{eff}$ the effective-bandwidth, and $T_{FFT}$ the (effective) chirp-duration. In the received signal, therefore, the instantaneous frequency can be determined according to equation 4, in which d represent distance.

$$\text{Inst. Freq} = \frac{1}{2\pi}\frac{d}{dt}\left(2\pi\left(f_c t + \frac{1}{2}\mu t^2\right)\right) = f_c + \mu t \qquad \text{Eq. 5}$$

Within an FMCW radar application, the process of extracting an original message signal from the modulated wave is known as detection or demodulation. The signal processing system (e.g., as implemented by radar units 10, 20 and/or radar controller processor 30 of FIG. 1), which demodulates the modulated wave is known as the demodulator that attempts to reconstruct the transmitted signal out of the received signal. The received-signal for FMCW-radar (Rx), therefore, after a time-of-flight (ToF) of $\tau$, is given by equation 6.

$$Rx : r(t) = \mathcal{R}\left\{\exp\left(j2\pi\left(f_c(t-\tau) + \frac{1}{2}\mu(t-\tau)^2\right)\right)\right\} \qquad \text{Eq. 7}$$

By mixing the received signal with the transmitted signal and applying low-pass filtering (LPF) a beat signal y(t) is generated, which is given by equation 8.

$$y(t) = LPF(x(t)r^*(t)) = \mathcal{R}\left\{\exp\left(j2\pi\left((\mu\tau)t + f_c\tau - \frac{1}{2}\mu\tau^2\right)\right)\right\} \qquad \text{Eq. 9}$$

The beat-frequency $f_b$, i.e., the frequency of y(t) as given by equation 10.

$$f_b = \frac{1}{2\pi}\frac{d}{dt}\left(2\pi\left((\mu\tau)t + f_c\tau - \frac{1}{2}\mu\tau^2\right)\right) = \mu\tau \qquad \text{Eq. 11}$$

Given that beat signal and the known beat frequency $f_b$, target-distance R is then given by equation 12. Targets are typically determined by identifying peaks in beat-frequency $f_b$ signal that exceed a predetermined detection threshold. The threshold can be determined using an algorithm, such as a constant faluse alarm rate (CFAR) algorithm. A peak detector is then used to find all the peaks (i.e. targets) in the beat signal with magnitudes exceeding that threshold.

$$R = \frac{1}{2}c_0\tau = \frac{1}{2}c_0\frac{f_b}{\mu} \qquad \text{Eq. 13}$$

In equation 14, $c_0$ is the phase velocity in free space, i.e., the speed-of-light ($\approx 3 \cdot 10^8$ m/s).

Although the determination of target distance is illustrated mathematically above, it may be noted that for practical reasons, small portions of the received reflection signals Rx are not processed for brief periods ($T_{dwell}$, $T_{settle}$, $T_{reset}$) after the modulation ramp begins because, for example, incoming reflections will have overlapping modulation from the previous modulation cycle and the settling of circuitry like a phase-locked-loop (PLL).

In the present disclosure, a model is developed to provide improved timing offset estimation in radar systems undertaking line-of-sight (LOS) operation with two operative radar stations. In coherent distributed radar systems having first and second radar units (e.g., radar unit 10 and radar unit 20 of FIG. 1) employing full-duplex transmissions, the phase $\Phi_{1k}(t)$ of the individual chirp signals for the radar system's first radar unit (i.e., radar unit 1), with relative drift in time $\delta_t$ between the two stations, timing-offset $\Delta\tau_{1k}$, frequency-offset $\Delta f$ between both stations, and the RF bandwidth B is given by equation 15.

$$\Phi_{1k}(t) = 2\pi\left(f_c + \frac{\Delta f}{2} - \frac{B}{2}\right)\left(1 + \frac{\delta_t}{2}\right)t + \qquad \text{Eq. 16}$$

$$2\pi\mu\left(\frac{\left(1 + \frac{\delta_t}{2}\right)^2}{2}t^2 + \Delta\tau_{1k}\left(1 + \frac{\delta_t}{2}\right)t\right) + \Psi_{1k}\left(\left(1 + \frac{\delta_t}{2}\right)t\right) + \Theta_{1k}$$

In equation 17, $$\mu = \frac{B}{T_{sw}}$$

is the chirp-rate (chirp-slope) while $T_{sw}$ is the sweep-time, i.e., the chirp duration, $k \in \{0, \ldots, K-1\}$ indicates the FMCW chirp number with K chirps being transmitted and received, $\Psi_{1k}(t)$ is the phase noise (PN), and $\Theta_{1k}$ is an arbitrary initial phase. Note that for the second radar unit (i.e., radar unit 2) a similar mathematical model holds for that unit's individual chirp signal phase $\Phi_{2k}(t)$, only with a sign reversal for the frequency-offset $\Delta f$ and the relative drift in time $\delta_t$.

Given the individual chirp signal phases $\Phi_{1k}(t)$ and $\Phi_{2k}(t)$ for the first and second radar units, the signals being transmitted by the first and second radar unit ($s_{1k,tx}(t)$ and $s_{2k,tx}(t)$) may be expressed according to equation 18.

$$s_{1k,tx}(t) = A_1 \exp\{j\Phi_{1k}(t)\}, \qquad \text{Eq. 19}$$

$$s_{2k,tx}(t) = A_2 \exp\{j\Phi_{2k}(t)\}$$

The signals ($s_{1k,tx}(t)$ and $s_{2k,tx}(t)$) are the transmitted signals by each radar unit, respectively, and serve as references for later down-conversion in which $A_1$ and $A_2$ denote the chirp signal amplitudes. Hence, the signals received at the opposite radar units ($s_{2k,rx}(t)$ and $s_{1k,rx}(t)$) over the time-dependent wireless channel with propagation time $\tau_k$, Doppler frequency-shift $f_D$, and attenuation coefficient $\alpha$ are expressed according to equation 20.

$$s_{2k,rx}(t) = \alpha A_1 \exp\{j\Phi_{1k}(t - \tau_k)\}\exp\{j2\pi f_D t\}, \qquad \text{Eq. 21}$$

$$s_{1k,rx}(t) = \alpha A_2 \exp\{j\Phi_{2k}(t - \tau_k)\}\exp\{j2\pi f_D t\}$$

With the transmitted and received signals for the first radar unit (i.e., the signal transmitted by the first radar unit $s_{1k,tx}(t)$ and the signal received by the first radar unit $s_{1k,rx}(t)$) determined, the corresponding mixed signal ($s_{1k,mix}(t)$) is determined according to equation 22.

$$s_{1k,mix}(t) = s_{1k,tx}(t)(s_{1k,rx}(t))^* \qquad \text{Eq. 23}$$

-continued $$= A\,\exp\left\{j\left(2\pi\left((\delta_f - f_D)t + \left(f_c - \frac{B}{2}\right)\tau_k + \mu((\tau_0 + \Delta\tau + \delta_t kT_{sw})t + \delta_t t^2)\right) + \Theta_{1k} - \Theta_{2k} + \Psi_{1k}\left(\left(1 + \frac{\delta_t}{2}\right)t\right) - \Psi_{2k}\left(\left(1 - \frac{\delta_t}{2}\right)(t - \tau_k)\right)\right)\right\}$$

In equation 24, A is the signal amplitude, $$\delta_f = \Delta f + \delta_t\left(f_c - \frac{B}{2}\right)$$

is the total frequency offset, and with the ToF modeled as $\tau_k = \tau_0 + \tau'_k$ where $\tau_0$ and $\tau'_k$ are the initial ToF and the propagation-time change in the wireless channel, respectively. Note that for the second radar unit (i.e., radar unit 2) a similar mathematical model holds for the mixed signal $s_{2k,mix}(t)$ only with a sign reversal for the Doppler frequency-shift, the initial ToF, and for the PN the interchange of the ToF $\tau_k$ between radar unit 1 and radar unit 2.

Within each radar unit, their respective ADCs are controlled by their own internal clock sources and, as such, the mixing products are not available as sampled data. Sampling operations in each of radar unit 1 and radar unit 2 are therefore delayed by $\Delta\tau_{1k}$ and $\Delta\tau_{2k}$, respectively. Consequently, the FMCW beat signals $s_{1k,beat}(t)$ and $s_{2k,beat}(t)$ may be expressed as a time delayed versions of both mixed signals ($s_{1k,mix}(t)$ and $s_{2k,mix}(t)$), respectively. In practical implementation of the radar systems, some multiple access schemes, such as frequency-division multiple access (FDMA) may be needed to separate the two bi-static radar responses. A common requirement for the radar system, therefore, is that the radar scenes seen by the two bi-static radar units be the same.

The frequency-domain beat signals for radar unit 1 ($s_{1k,beat}(f)$) and radar unit 2 ($s_{2k,beat}(f)$) may each be derived from the respective time-domain beat signals $s_{1k,beat}(t)$ and $s_{2k,beat}(t)$ via application of a discrete Fourier transform. Because unknown parameters can be derived via discretized or continuous signals if the Nyquist sampling criterion holds, all computational steps are described with continuous time signals. FMCW chirps are of limited duration $t<T_{sw}$. Therefore, a suitable window function $w(t)$ might be multiplied with the time domain signals to reduce the sidelobe level of the beat signals in the frequency domain.

The Fourier transform $\mathcal{F}\{\bullet\}$, after windowing (e.g., via application of the window function), the beat-signals for radar unit 1 and radar unit 2 are given by equation 25.

$$s_{1k,beat}(f) = \mathcal{F}\{w(t)s_{1k,beat}(t)\} = \qquad\text{Eq. 26}$$
$$A\left[\delta\{f - ((\delta_f - f_D) + \mu(\tau_0 + \Delta\tau + \delta_t kT_{sw}))\} * \mathcal{F}\{w(t)\exp\{j2\pi\mu\delta_t t^2\}\} *\right.$$
$$\left.\mathcal{F}\{\exp\{j\Psi_{pn,1k}(t)\}\}\right] \cdot \exp\{j\gamma_{1k}\} \cdot \exp\left\{j\left(2\pi\left(f_c - \frac{B}{2}\right)\tau_k + \Theta_{1k} - \Theta_{2k}\right)\right\}$$

$$s_{2k,beat}(f) =$$
$$A\left[\delta\{f - ((\delta_f + f_D) + \mu(-\tau_0 + \Delta\tau + \delta_t kT_{sw}))\} * \mathcal{F}\{w(t)\exp\{j2\pi\mu\delta_t t^2\}\} *\right.$$
$$\left.\mathcal{F}\{\exp\{j\Psi_{pn,2k}(t)\}\}\right] \cdot \exp\{j\gamma_{2k}\} \cdot \exp\left\{j\left(-2\pi\left(f_c - \frac{B}{2}\right)\tau_k + \Theta_{1k} - \Theta_{2k}\right)\right\}$$

In equation 27, $$\Psi_{pn,1k}(t) = \Psi_{1k}\left(\left(1 + \frac{\delta_t}{2}\right)t\right) - \Psi_{2k}\left(\left(1 - \frac{\delta_t}{2}\right)(t - \tau_k)\right),$$

$$\Psi_{pn,2k}(t) = \Psi_{1k}\left(\left(1 + \frac{\delta_t}{2}\right)(t - \tau_k)\right) - \Psi_{2k}\left(\left(1 - \frac{\delta_t}{2}\right)t\right),$$

and $\{\gamma_{1k}, \gamma_{2k}\}$ the phase-shifts caused by the delays of the ADCs. Note, that $\{\Psi_{pn,1k}(t), \Psi_{pn,2k}(t)\}$ has negligible influence on the peak position and as such can be approximated by $\{\mathcal{F}\{\exp\{j\Psi_{pn,1k}(t)\}\}\approx\delta(f), \mathcal{F}\{\exp\{j\Psi_{pn,2k}(t)\}\}\approx\delta(f)\}$ to estimate the unknown parameters. As can be seen, the corresponding beat-signals are modelled by employing a relative time base, which depends on a timing offset $\Delta\tau$ and an LO drift $\delta_t$.

It is possible to simplify the beat signal expressions of equation 28, by presuming the local oscillators are adjusted to the same frequency, i.e., $\delta_f \approx 0$ and $\Delta f=0$. Furthermore, the wireless channel is reciprocal and allows identical signal transmission in both directions. With those assumptions, the Fourier transform of the IF beat signals can be given by equation 29.

$$s_{1k,beat}(f) = A \cdot W\{f - (\mu(\Delta\tau + \tau_0) - f_D)\} * \qquad\text{Eq. 30}$$
$$\mathcal{F}\{\exp\{j\Psi_{pn,1k}(t)\}\}\exp\{j2\pi f_c\tau_k\}\cdot\exp\{j(\varphi_{1k} - \varphi_{2k} + \gamma_{1k}(\Delta\tau, \delta_t))\}$$

$$s_{2k,beat}(f) = A \cdot W\{f - (\mu(\Delta\tau - \tau_0) + f_D)\} *$$
$$\mathcal{F}\{\exp\{j\Psi_{pn,2k}(t)\}\}\exp\{-j2\pi f_c\tau_k\}\cdot\exp\{j(\varphi_{1k} - \varphi_{2k} + \gamma_{1k}(\Delta\tau, \delta_t))\}$$

These beat spectra of both of radar unit 1 and radar unit 2 are centered around the frequency $f_{shift}=\mu\Delta\tau$, which may be affected by unknown trigger timing offsets, which may depend on internal circuit delays and the trigger cable length. The beat spectra of radar unit 2 are mirrored at $f_{shift}$, and the complex conjugate is calculated. Due to defined timing, the additional phase shift values $\{\gamma_{1k}(\Delta\tau, \delta_t), \gamma_{2k}(\Delta\tau, \delta_t)\}$ are constant and can be removed via calibration. Thereafter, the bistatic beat signals for radar unit 1 and radar unit 2 can be expressed by equation 31.

$$s_{1k,beat}(f - \mu\Delta\tau) = A \cdot W\{f - \mu(\tau_0 + \Delta\tau) + f_D\} * \qquad\text{Eq. 32}$$
$$\mathcal{F}\{\exp\{j\Psi_{pn,1k}(t - \Delta\tau)\}\}\exp\{j(2\pi f_c\tau_k + \psi_k)\}$$

$$s_{2k,beat}(f + \mu\Delta\tau) =$$
$$A \cdot W\{f - \mu(\tau_0 - \Delta\tau) + f_D\} * \mathcal{F}\{\exp\{-j\Psi_{pn,2k}(t - \Delta\tau)\}\}\exp\{j(2\pi f_c\tau_k - \psi_k)\}$$

In equation 33, $\psi_k$ expresses the unknown initial phase of the FMCW chirps. A second FFT may be applied to the beat signals as expressed in equation 13 (e.g., in the "slow-time" dimension), to generate distance-velocity bi-static signals according to equation 34.

$$s_{1kl}((f - \mu\Delta\tau), f_2) = \qquad\text{Eq. 35}$$
$$[A \cdot W\{f - \mu(\tau_0 + \Delta\tau) + f_D\} *$$
$$\mathcal{F}\{\exp\{j\Psi_{pn,1k}(t)\}\}] \cdot \left[W_2\left(f_2 + f_c\frac{vT_{sw}}{c_0}\right) *\right.$$
$$\left.\mathcal{F}\{\exp\{j\Psi_{pn,1l}(t)\}\}\right] \cdot \exp\{j2\pi f_c\tau_k + \psi_k\}$$

-continued $$s_{2kl}((f + \mu\Delta\tau), f_2) =$$

$$[A \cdot W\{f - \mu(\tau_0 - \Delta\tau) + f_D\} * \mathcal{F}\{\exp\{-j\Psi_{pn,2k}(t)\}\}] \cdot \left[W_2\left(f_2 + f_c\frac{vT_{sw}}{c_0}\right) * \mathcal{F}\{\exp\{-j\Psi_{pn,2l}(t)\}\}\right] \cdot \exp\{j2\pi f_c\tau_k - \psi_k\}.$$

Without any timing offset, the beat frequencies for a signal reflected from the same target as observed by radar unit 1 and radar unit 2 are at $f_{kl,beat} = \mu\tau_0$. Due to the present timing offset, however, the target at the first radar unit 1 is located at frequency $f_{1kl,beat} = \mu(\tau_0 + \Delta\tau)$ in the distance direction, while the same target at the second radar unit 2 is located at $f_{2kl,beat} = \mu(\tau_0 - \Delta\tau)$ in the distance direction.

Figure 3:
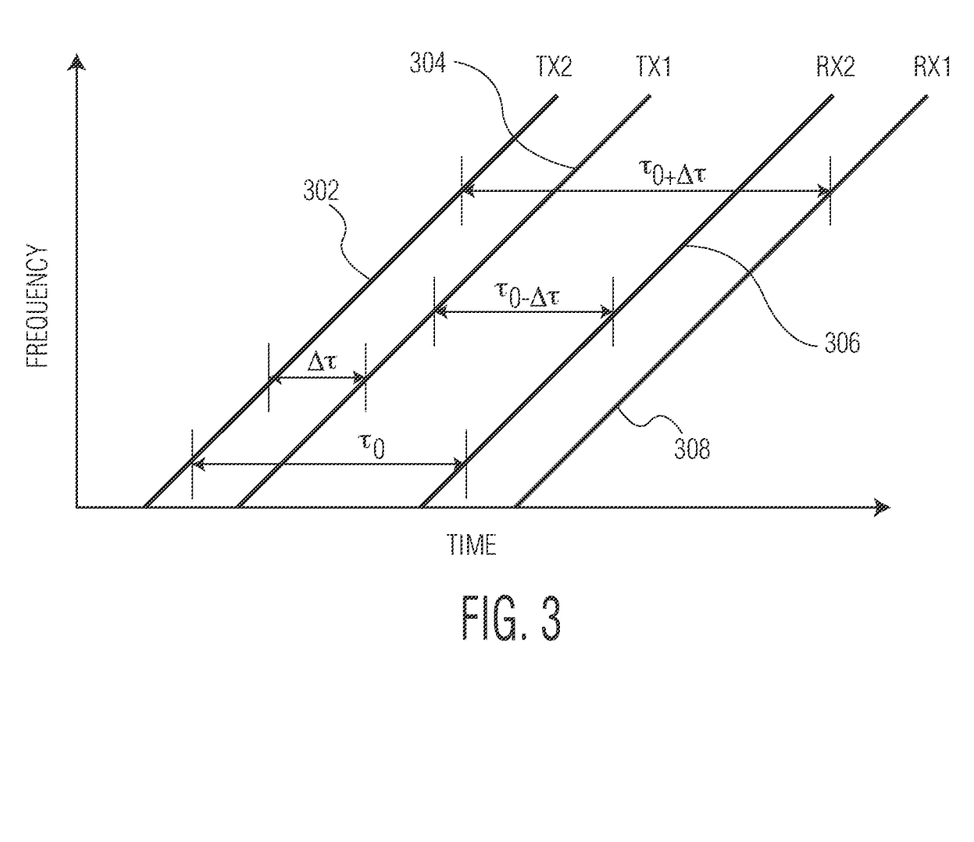
FIG. 3 is a chart depicting time and frequency offsets (and consequently, observed distance offsets) in the signals transmitted and received by radar units.

Consequently, the two observations of the same target as seen by radar unit 1 and radar unit 2 form a mirror image $\pm\Delta\tau$ with the correct target $\mu\tau_0$ being located in the middle between those two observations. This mirror image phenomenon is illustrated by FIG. 3. FIG. 3 is a chart depicting time and frequency offsets (and consequently, observed distance offsets) in the signals transmitted and received by each of radar unit 1 and radar unit 2. The horizontal axis of FIG. 3 represents time, while the vertical axis represents frequency. As illustrated by FIG. 3, there is a timing offset of $\Delta\tau$ between the signals transmitted by radar unit 2 (see trace 302) and radar unit 1 (see trace 304). And a similar timing offset of $\Delta\tau$ between the signals received by radar unit 2 (see trace 306) and radar unit 1 (see trace 308). As a result, the time-of-flight (ToF) of bi-static 12 (TX1 to RX2) becomes $\tau_0 - \Delta\tau$ and ToF of bi-static 21 (TX2 to RX1) becomes $\tau_0 + \Delta\tau$.

It is possible to exploit this reciprocal ToF property to estimate the timing offset between radar unit 1 and radar unit 2. Specifically, the timing offset $\Delta\tau$ can be estimated as by the expression of equation 36.

$$\left.\begin{aligned}\widehat{\Delta\tau} &= \frac{1}{\mu}(f_{1kl,beat} - f_{kl,beat}) \text{ or,} \\ \widehat{\Delta\tau} &= \frac{1}{\mu}(f_{kl,beat} - f_{2kl,beat})\end{aligned}\right\} \Rightarrow \widehat{\Delta\tau} = \frac{1}{2\mu}(f_{1kl,beat} - f_{2kl,beat}) \quad \text{Eq. 37}$$

The expression of equation 38 presumes a known beat frequency of the target signal without timing offset. In an embodiment, it is possible to transmit a reference target signal with a known distance and velocity using a dedicated transmission link from radar unit 1 to radar unit 2 and vice versa. As the correct beat frequency, without any timing offset, the reference target is known at both radar unit 1 and radar unit 2 and the timing offset can be estimated finding the actual beat frequencies $f_{1/2kl,beat}$ of the reference target via the estimation of equation 39. However, this approach requires a dedicated link for transmission of reference target between the first and second radar unit, adding complexity to the radar system implementation. In the present approach, due to the reciprocity attribute described above, for any detected target, due to timing offset between radar unit 1 and radar unit 2, the beat frequencies at the two radar units form mirror images with the correct beat frequency being in the middle. Therefore, every detected target can be "upgraded" to a reference target and used for timing offset determination. In practice, it makes sense to process the strongest observed target as that target has the largest signal to noise ratio. In this case, the timing offset between radar unit 1 and radar unit 2 may be estimated according to the expression of equation 40.

$$\widehat{\Delta\tau} = \frac{1}{2\mu}\left[\max_f\{\arg\{s_{1kl}((f - \mu\Delta\tau), f_2)\}\} - \max_f\{\arg\{s_{2kl}((f + \mu\Delta\tau), f_2)\}\}\right]. \quad \text{Eq. 41}$$

After the timing offset is estimated, the offset can be corrected, e.g., by multiplying a complex exponential of the form $\exp(\pm j2\pi(\mu\widehat{\Delta\tau})t)$ with the received time-domain beat signal $s_{1/2k,beat}(t)$. Moreover, for radar receivers with multiple receive antennas, the timing offset may be estimated only once and the same correction can be applied to later signals received by all receive antennas in the same manner.

Figure 4:
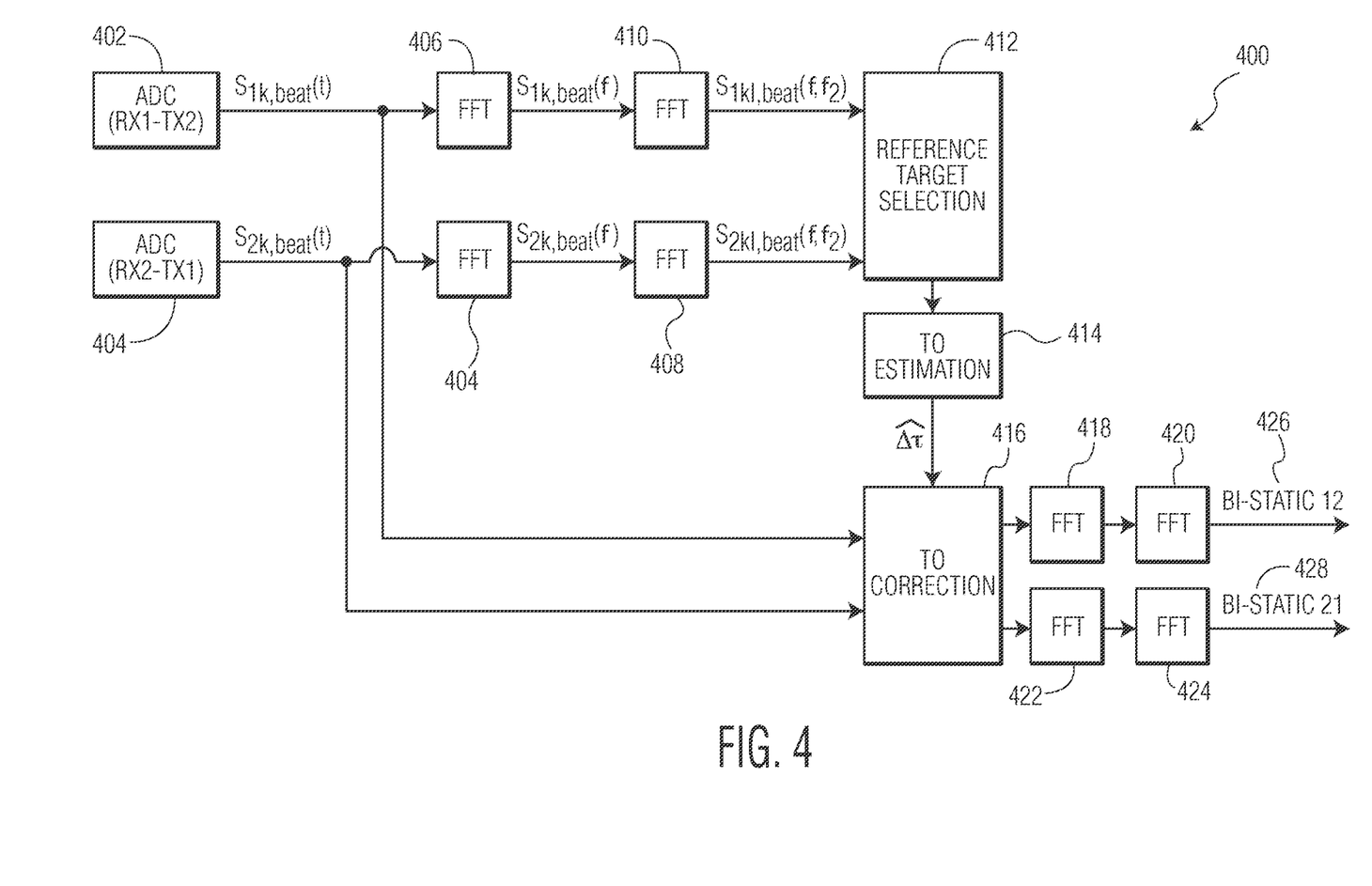
FIG. 4 is a block diagram depicting components of a system for timing offset estimation configured in accordance with the present disclosure.

FIG. 4 is a block diagram and flowchart depicting components of and steps implemented by a radar system for timing offset estimation in accordance with the present disclosure. Specifically, FIG. 4 depicts components of a signal processing system 400 (e.g., radar system 100 of FIG. 1) System 400 includes two signal processing paths that may be at least partially implemented by two separate radar units (e.g., radar unit 10 or radar unit 20 of FIG. 1). System 400 includes ADC 402 (e.g., an ADC of radio unit 10) and ADC 404 (e.g., an ADC of radio unit 20). ADC 402 and ADC 404 are configured to process signals received by corresponding receive antennas to generate output beat signals $s_{1k,beat}(t)$ and $S_{2k,beat}(t)$. FFTs 406, 408 are applied to the time domain beat signals to generate frequency domain beat signals $s_{1k,beat}(f)$ and $s_{2k,beat}(f)$. Subsequent FFTs 408, 410 are applied to the frequency domain beat signals to generate distance-velocity bi-static signals $s_{1kl}((f-\mu\Delta\tau), f_2)$ and $s_{2kl}((f-\mu\Delta\tau), f_2)$. The distance-velocity bi-static signals are processed to identify reference targets in each signal by reference target selection block 412. As described above, the target in each bi-static signal associated with the highest magnitude reflected signal in each signal can be selected as the reference target in each bi-static signal and can be presumed to be the same target as observed in each bi-static signal.

With the reference targets identified, the reciprocity principle described above is exploited by the timing offset estimation block 414 to perform timing offset estimation using the distance-velocity bi-static signals as described above. Specifically, the timing offset can be estimated by determining the distance between the reference targets as observed by the first radar unit (e.g., including ADC 402) and the second radar unit (e.g., including ADC 404).

With the timing offset estimated, the timing offset may be used (e.g., by timing offset correction block 416) to phase shift and/or time shift correct each distance-velocity bi-static signals $s_{1kl}((f-\mu\Delta\tau), f_2)$ and $s_{2kl}((f-\mu\Delta\tau), f_2)$ as they are received by the radar system via its signal receipt and processing system, which can then go through conventional signal processing (e.g., by FFTs 418, 420, 422, 424) to generate conventional and timing offset corrected bi-static signals 426, 428 for conventional signal processing and target identification.

Figure 5:
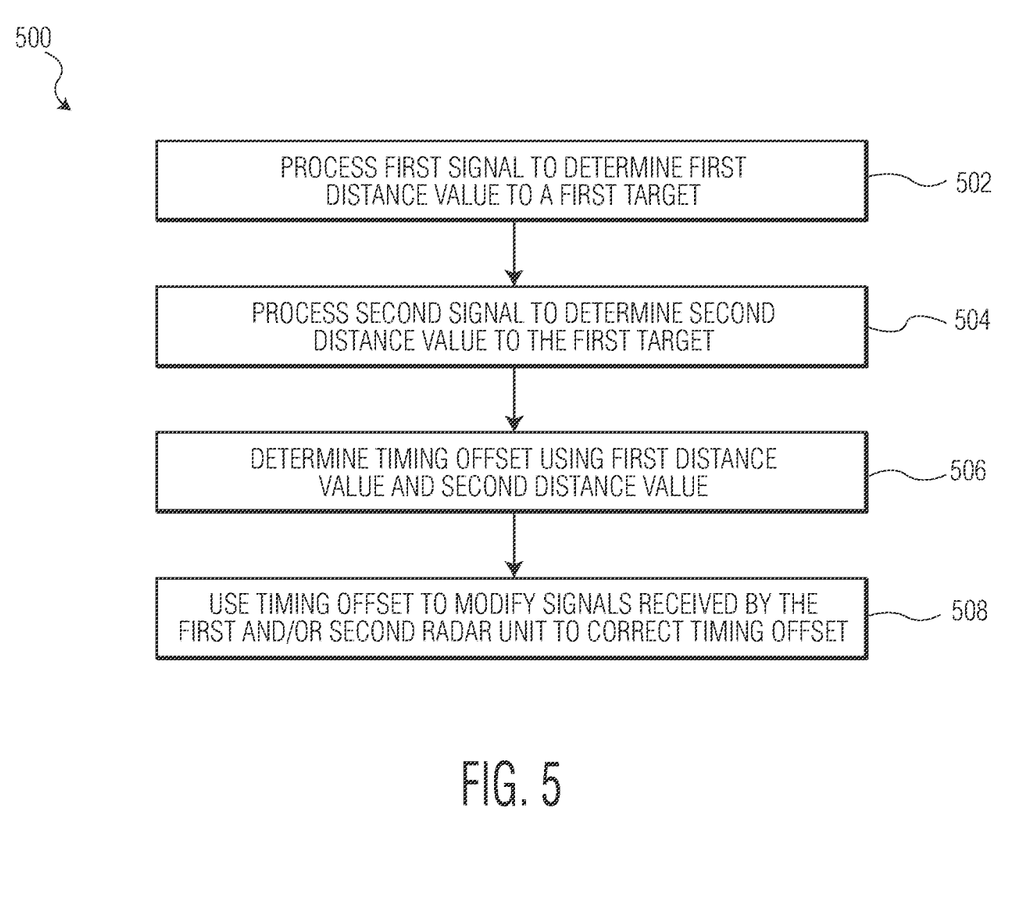
FIG. 5 is a flowchart of an example method for determining a timing offset between a first radar unit and a second radar unit of a coherent distributed radar system.

FIG. 5 is a flowchart of an example method 500 for determining a timing offset between a first radar unit and a second radar unit of a coherent distributed radar system. Method 500 may be implemented, for example, by components of distributed coherent radar system 100 of FIG. 1, such as combinations of radar controller processor 30 and distributed radar unit 10 and distributed radar unit 20. In various embodiments, method 500 may be implemented by executing various functional steps, such as those illustrated in FIG. 4 and described above.

In step 502, a first signal (i.e., a reflected radar signal) is received by a first radar unit (e.g., distributed radar unit 10) of the radar system. The first radar unit is configured to process that signal, in accordance with the methods described herein, to determine a first value indicative of a first distance value to a first target identified within that received signal. In various embodiments, the first target is determined to be the strongest target in that received signal, although other approaches may be utilized to identify the first target within the received signal.

In step 504, a second signal (i.e., a reflected radar signal) is received by a second radar unit (e.g., distributed radar unit 20) of the radar system. The second radar unit is configured to process that signal, in accordance with the methods described herein, to determine a second value indicative of a second distance value to the first target identified within that received signal. In various embodiments, the first target is determined to be the strongest target in that received signal, although other approaches may be utilized to identify the first target within the received signal.

In step 506, a timing offset value is determined based upon a difference between the first distance value and the second distance value according to the methods described herein.

In step 508 the timing offset value is used to modify at least one of a third signal received by the first radar device and a fourth signal received by the second radar device to mitigate a timing offset between operations of the first radar device and the second radar device.

As described above, radar reflections are received in the form of two-dimensional data frames in which a first dimension of the data frame is referred to as the "fast time" dimension and represents data values that were captured from the different pulsed signals and the second dimension is referred to as the "slow time" dimension and represents data values that were captured in response to the different chirp signals that may be included within a particular pulsed signal that was transmitted by transmitter. In various embodiments, the present timing offset approach may be implemented by a radar system after executing both the first (distance or fast time) FFT and the second (Doppler or slow time) FFT on the on the received data frame. In other embodiments, however, the present timing offset algorithm may be executed after only executing the first (distance) FFT. Additionally, although embodiments are contemplated in which each of the two radar units identify the reference target as being the strong or highest magnitude target in the received radar signals (i.e., the same target as observed by each of the received radar signals), alternate approaches may involve using multiple targets that are identified in the received radar signals, where the targets have associated signal magnitudes above the noise floor to improve the signal to noise ratio (SNR) of the timing offset estimation. Moreover, interpolation techniques for off-FFT-grid targets can also be applied.

In some cases, the timing offset between different radar units may be time varying in that the timing offset between radar units may be different when processing different chirp signals within a particular received radar data frame. In that case, the present approach for timing offset estimation may be executed after the $1^{st}$ (distance) FFT where the timing offset is estimated for each chirp signal independently.

In some aspects, the techniques described herein relate to a distributed aperture bi-static radar system, including: a first multi-antenna radar device, including: a first local oscillator reference clock generator, a first signal processor component coupled to a first plurality of transmit antennas, the first signal processor component being configured to transmit a first radar signal via the first plurality of transmit antenna, and a first plurality of receive antennas; a second multi-antenna radar device, including: a second local oscillator reference clock generator, a second signal processor component coupled to a second plurality of transmit antennas, the second signal processor component being configured to transmit a second radar signal via the second plurality of transmit antennas, and a second plurality of receive antennas; and a processor coupled to the first multi-antenna radar device and the second multi-antenna radar device, the processor being configured to: process a first signal received via the first plurality of receive antennas to generate a first distance-velocity bi-static signal, process a second signal received via the second plurality of receive antennas to generate a second distance-velocity bi-static signal, determine a timing offset between operations of the first multi-antenna radar device and the second multi-antenna radar device by: determining a first beat signal frequency of a target in the first distance-velocity bi-static signal; determining a second beat signal frequency of the target in the second distance-velocity bi-static signal; and determining a timing offset value based on a difference between the first beat signal frequency and the second beat frequency signal, and multiply a complex exponential value determined by the timing offset value with a third signal received via the first plurality of receive antennas to at least one of phase-shift and time-shift the third signal to mitigate the timing offset between operations of the first multi-antenna radar device and the second multi-antenna radar device.

In some aspects, the techniques described herein relate to a system, including: a first radar device including a first plurality of receive antennas; a second radar device including a second plurality of receive antennas, wherein the first radar device and the second radar device are configured to operate as part of a distributed aperture bi-static radar system; and a controller configured to: process a first chirp signal received by the first radar device to determine a first value indicative of a first distance to a first target, process a second chirp signal received by the second radar device to determine a second value indicative of a second distance to a second target, determine that the first target and the second target are the same target, determine a timing offset value based upon a difference between the first value and the second value, and use the timing offset value to modify at least one of a third chirp signal received by the first radar device and a fourth chirp signal received by the second radar device to mitigate a timing offset between operations of the first radar device and the second radar device.

In some aspects, the techniques described herein relate to a method, including: processing a first chirp signal received via a first radar device of a distributed aperture bi-static radar system to determine a first value indicative of a first distance to a first target; processing a second chirp signal received via a second radar device to determine a second value indicative of a second distance to a second target; determining that the first target and the second target are the same target; determining a timing offset value based upon a difference between the first value and the second value, and using the timing offset value to modify at least one of a third chirp signal received by the first radar device and a fourth chirp signal received by the second radar device to mitigate a timing offset between operations of the first radar device and the second radar device.

Although the examples have been described with reference to automotive radar systems, the systems and methods described herein may be implemented in conjunction with other types of radar systems.

The preceding detailed description is merely illustrative in nature and is not intended to limit the embodiments of the subject matter or the application and uses of such embodiments.

As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with, electrically or otherwise) another element, and not necessarily mechanically. Thus, although the schematic shown in the figures depict one exemplary arrangement of elements, additional intervening elements, devices, features, or components may be present in an embodiment of the depicted subject matter.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A distributed aperture bi-static radar system, comprising:
   a first multi-antenna radar device, comprising:
      a first local oscillator reference clock generator,
      a first signal processor component coupled to a first plurality of transmit antennas, the first signal processor component being configured to transmit a first radar signal via the first plurality of transmit antenna, and
      a first plurality of receive antennas;
   a second multi-antenna radar device, comprising:
      a second local oscillator reference clock generator,
      a second signal processor component coupled to a second plurality of transmit antennas, the second signal processor component being configured to transmit a second radar signal via the second plurality of transmit antennas, and
      a second plurality of receive antennas; and
   a processor coupled to the first multi-antenna radar device and the second multi-antenna radar device, the processor being configured to:
      process a first signal received via the first plurality of receive antennas to generate a first distance-velocity bi-static signal,
      process a second signal received via the second plurality of receive antennas to generate a second distance-velocity bi-static signal,
      determine a timing offset between operations of the first multi-antenna radar device and the second multi-antenna radar device by:
         determining a first beat signal frequency of a target in the first distance-velocity bi-static signal;
         determining a second beat signal frequency of the target in the second distance-velocity bi-static signal; and
         determining a timing offset value based on a difference between the first beat signal frequency and the second beat signal frequency, and
      multiply a complex exponential value determined by the timing offset value with a third signal received via the first plurality of receive antennas to at least one of phase-shift and time-shift the third signal to mitigate the timing offset between operations of the first multi-antenna radar device and the second multi-antenna radar device.

2. The distributed aperture bi-static radar system of claim 1, wherein the processor is configured to multiply the complex exponential value determined by the timing offset value with a fourth signal received via the second plurality of receive antennas to at least one of phase-shift and time-shift the fourth signal to mitigate the timing offset between operations of the first multi-antenna radar device and the second multi-antenna radar device.

3. The distributed aperture radar system of claim 1, wherein the first signal processor component is configured to generate the first distance-velocity bi-static signal by applying range and Doppler processing steps to the first signal received via the first plurality of receive antennas.

4. The distributed aperture radar system of claim 3, where the first signal processor component computes range fast Fourier transforms (FFTs) and Doppler FFTs on the first signal to generate the first distance-velocity bi-static signal.

5. The distributed aperture radar system of claim 3, wherein the second signal processor component is configured to generate the second distance-velocity bi-static signal by applying range and Doppler processing steps to the second signal received via the second plurality of receive antennas.

6. A system, comprising:
   a first radar device comprising a first plurality of receive antennas;

a second radar device comprising a second plurality of receive antennas, wherein the first radar device and the second radar device are configured to operate as part of a distributed aperture bi-static radar system; and a controller configured to:
  process a first chirp signal received by the first radar device to determine a first value indicative of a first distance to a first target,
  process a second chirp signal received by the second radar device to determine a second value indicative of a second distance to a second target,
  determine that the first target and the second target are the same target,
  determine a timing offset value based upon a difference between the first value and the second value, and
  use the timing offset value to modify at least one of a third chirp signal received by the first radar device and a fourth chirp signal received by the second radar device to mitigate a timing offset between operations of the first radar device and the second radar device.

7. The system of claim 6, wherein the controller is configured to use the timing offset value to modify the at least one of a third chirp signal received by the first radar device and the fourth chirp signal by multiplying a complex exponential value determined by the timing offset value with the at least one of the third chirp signal and the fourth chirp signal.

8. The system of claim 6, wherein the controller is configured to process the first chirp signal to determine the first value indicative of the first distance to the first target by:
  generating a first distance-velocity bi-static signal based upon the first chirp signal; and
  determining a first beat signal frequency of the first target in the first distance-velocity bi-static signal.

9. The system of claim 8, wherein the first value indicative of the first distance to the first target is the first beat signal frequency of the first target.

10. The system of claim 8, wherein the controller is configured to process the second chirp signal to determine the second value indicative of the second distance to the second target by:
  generating a second distance-velocity bi-static signal based upon the second chirp signal; and
  determining a second beat signal frequency of the second target in the second distance-velocity bi-static signal.

11. The system of claim 10, wherein the second value indicative of the second distance to the second target is the second beat signal frequency of the second target.

12. The system of claim 8, wherein the controller is configured to generate the first distance-velocity bi-static signal by applying range and Doppler processing steps to the first chirp signal.

13. The system of claim 8, wherein the controller computes range fast Fourier transforms (FFTs) and Doppler FFTs on the first chirp signal to generate the first distance-velocity bi-static signal.

14. A method, comprising:
  processing a first chirp signal received via a first radar device of a distributed aperture bi-static radar system to determine a first value indicative of a first distance to a first target;
  processing a second chirp signal received via a second radar device to determine a second value indicative of a second distance to a second target;
  determining that the first target and the second target are the same target;
  determining a timing offset value based upon a difference between the first value and the second value, and
  using the timing offset value to modify at least one of a third chirp signal received by the first radar device and a fourth chirp signal received by the second radar device to mitigate a timing offset between operations of the first radar device and the second radar device.

15. The method of claim 14, wherein using the timing offset value to modify the at least one of the third chirp signal and the fourth chirp signal includes multiplying a complex exponential value determined by the timing offset value with the at least one of the third chirp signal and the fourth chirp signal.

16. The method of claim 14, further comprising processing the first chirp signal to determine the first value indicative of the first distance to the first target by:
  generating a first distance-velocity bi-static signal based upon the first chirp signal; and
  determining a first beat signal frequency of the first target in the first distance-velocity bi-static signal, wherein the first value indicative of the first distance to the first target is the first beat signal frequency of the first target.

17. The method of claim 16, further comprising processing the second chirp signal to determine the second value indicative of the second distance to the second target by:
  generating a second distance-velocity bi-static signal based upon the second chirp signal; and
  determining a second beat signal frequency of the second target in the second distance-velocity bi-static signal, wherein the second value indicative of the second distance to the second target is the second beat signal frequency of the second target.

18. The method of claim 16, further comprising generating the first distance-velocity bi-static signal by applying range and Doppler processing steps to the first chirp signal.

19. The method of claim 16, further comprising computing range fast Fourier transforms (FFTs) and Doppler FFTs on the first chirp signal to generate the first distance-velocity bi-static signal.

* * * * *